United States Patent
Claver Tallon et al.

(10) Patent No.: US 9,565,833 B2
(45) Date of Patent: Feb. 14, 2017

(54) SYSTEM AND METHOD OF IDENTIFYING A DOMESTIC ANIMAL

(71) Applicant: FELIXCAN, S. L., Albacete (ES)

(72) Inventors: Julio Claver Tallon, Albacete (ES); Jose Gonzalez De La Aleja, Albacete (ES)

(73) Assignee: Felixcan, S.L., Albacete (ES)

(*) Notice: Subject to any disclaimer, the term of this patent is extended or adjusted under 35 U.S.C. 154(b) by 0 days.

(21) Appl. No.: 14/760,228

(22) PCT Filed: Aug. 25, 2014

(86) PCT No.: PCT/ES2014/070667
§ 371 (c)(1),
(2) Date: Jul. 10, 2015

(87) PCT Pub. No.: WO2015/028692
PCT Pub. Date: Mar. 5, 2015

(65) Prior Publication Data
US 2015/0351365 A1 Dec. 10, 2015

(30) Foreign Application Priority Data
Aug. 30, 2013 (ES) .................................. 201331291

(51) Int. Cl.
*A01K 11/00* (2006.01)
(52) U.S. Cl.
CPC .................................... *A01K 11/006* (2013.01)
(58) Field of Classification Search
CPC ................................. G06K 17/00; A01K 11/00
See application file for complete search history.

(56) References Cited

U.S. PATENT DOCUMENTS

| | | | |
|---|---|---|---|
| 2002/0115915 A1 | 8/2002 | Pratt et al. | |
| 2003/0015149 A1* | 1/2003 | Krey | G09F 3/08 119/858 |
| 2003/0038721 A1 | 2/2003 | Hogan | |
| 2004/0174261 A1* | 9/2004 | Volpi | G06K 7/0008 340/572.1 |
| 2013/0096369 A1 | 4/2013 | Folkers | |
| 2014/0263677 A1* | 9/2014 | Divringi | G06F 17/30879 235/494 |
| 2015/0039341 A1* | 2/2015 | Markman | G06F 19/322 705/3 |

FOREIGN PATENT DOCUMENTS

| | | |
|---|---|---|
| EP | 1240618 B1 | 5/2003 |
| WO | 9945761 A1 | 9/1999 |
| WO | 2006089634 A1 | 8/2006 |

* cited by examiner

*Primary Examiner* — Sonji Johnson
(74) *Attorney, Agent, or Firm* — Breiner & Breiner, L.L.C.

(57) ABSTRACT

A system including: a self-contained unit including a first data carrier having an electronic identification device that is readable by radio frequency and the reading of which activates an electronic data sheet in a first database; and a third data carrier including a second identification code readable by an optical reader. A method is also described which uses the reading of the third data carrier to activate an electronic data sheet in a second database, and to allow the associative data between both identification codes to be visualized.

6 Claims, 2 Drawing Sheets

FIG. 1
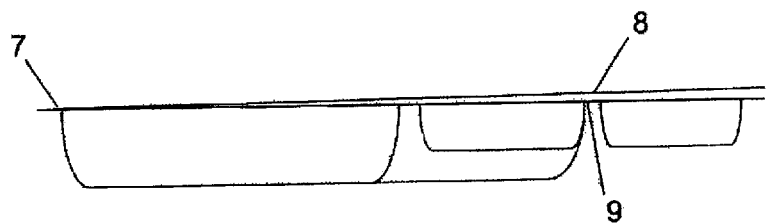
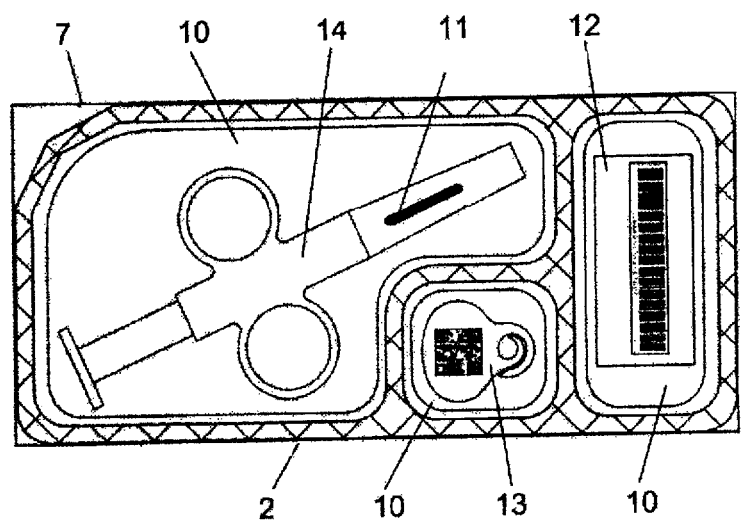
FIG. 2

SYSTEM AND METHOD OF IDENTIFYING A DOMESTIC ANIMAL

TECHNICAL BACKGROUND

The invention relates to a system and a method to facilitate the identification of a pet, in particular to facilitate the acquisition of knowledge of data related to the animal and more specifically its veterinary data, among other data, and ensure citizen control. It relates in particular to a system and a method for pet identification that provides for the use of an identification code that is independent and additional to the identification code of an electronic identification device, which was previously implanted in the pet, and is legible by means of a radio frequency system, but invisible to the direct view of the interested party.

BACKGROUND OF THE INVENTION

The most important data regarding the illnesses or events in the life of a pet, in addition to the veterinary treatment and follow-up, are currently inputted into electronic records of databases for use of the veterinary professional, which on occasion must be viewed by official authorities. The access to electronic records is carried out by reading the identification code included in an electronic identification device worn by the animal, whether hung, implanted, inserted or ingested into its body. Pursuant to regulated standards, each electronic identification device is programmed with a unique code that is usually locked to prevent its future alteration. The reading of this type of code can only be carried out by means of suitable radio frequency readers, which are customary among veterinary professionals and official authorities, even though they are not common in the rest of the population, for which reason access to these electronic records and the acquisition of knowledge of the data that is displayed in them appears to be restricted to the owners of the radio frequency readers, for all of whom it implies an optimum means of animal identification, and whose usefulness for other possible users is therefore nonexistent.

On the other hand, the owners of pets have been using means for linking to electronic records contained in non-professional databases, in which they are able to input the data about the animal as well as about themselves that they may deem appropriate. Identification plates or tags hung on pets and inscribed with QR identification codes, which are characterized by a quick response and are easy to read, among others by means of portable devices, such as smart phones, are used due to their versatility, immediacy and universalization; however, these tags can easily become lost and can be fraudulently interchanged, for which reason a better control is required.

It may be necessary under certain circumstances to gain immediate knowledge of the data contained in the electronic record of the professional database even if a radio frequency reader that may facilitate access to the latter is not available, for which reason it becomes necessary to utilize a different and reliable means to procure access to view its content.

A current method for tracking the stages in the life of a pet consists in the visual identification of a code printed in a physical medium, such as a label, card or paper passport, which easily deteriorates, leaving it to the experts and professional to edit or view the data in the electronic registries included in regional or national databases, even though this physical medium is not always with the animal.

Systems and procedures for compiling information about cattle are currently known in addition to systems for managing said information, which can transfer the data received and collected by the reader to databases of specific and particular data, such as those of the veterinary doctor, cattle owner, slaughterhouse and others, or to a central database. An example of this is presented by international patent WO99/45761, which utilizes identification elements of the animal per se to be read by means of wireless radio frequency readers within a path that the animal must take. The collected data can be transferred to a database or a database network.

It is obvious that this technology is superior to the technology of a paper passport, but its application to the identification of pets presents unreasonable disadvantages, the main disadvantage for its universalization being the lack of radio frequency readers in the population.

European patent EP 1240618 proposes a procedure for controlling the tracking of animals and a system for identification of animals for better management of the information related to such animals. The system allows the accurate, fast and automatic identification of the animals, making possible the input and transfer of the information relative to said animals between the users and/or a centralized database. The system for identification of animals and management of information regarding said animals relates a centralized database, which groups together the information concerning said animals with the readable identifier for a radio frequency reader that they carry. The system is composed of one or various independent communication systems for the user, wherein each system comprises in addition the identifier reading system, means of communication with the centralized database, means of communication between at least two independent systems, and a memory that integrates the information regarding the animal and which will be duplicated in the centralized database.

A universal and reliable, in addition to secure, precise and fast identification becomes necessary, however, when it is necessary to know the data about pets that have a proclivity to wandering off and frequently becoming lost.

OBJECT OF THE INVENTION

It is an object of the invention to eliminate the indicated disadvantages by proposing a method for better identification of pets and a system for said identification, with the purpose of acquiring knowledge regarding their veterinary state, owner and other data of the lost animal.

The invention proposes a precise identification of pets, which is in addition automatic and fast by associating an identification code that can be read by means of optical means to an identification code readable by means of radio frequency means, which are both initially contained in one autonomous unit, and relating between them the data contained in the at least two mutually independent databases, of which at least one of the databases contains official and/or veterinary data, and which can be accessed also in independent manner if the proper identification code is known.

DESCRIPTION OF THE INVENTION

The identification system of a pet comprises at least one first database containing individual electronic records, of which at least one electronic record contains the veterinary data of the pet, with the pet carrying a first information carrier composed of an electronic identification device that includes a first identification code and a visual representation of said first identification code of the pet. The identification code that is suitable for being read by a radio frequency reader will guide the reading to the corresponding electronic veterinary record via a suitable application.

The system includes an autonomous unit, which is preferably sterilized, composed of a package that defines at least one internal cavity and a kit provided in the package and contained in the internal cavity, or with at least one of its components being sterilized and contained in the internal cavity. The kit comprises the first information carrier in addition to a second and third information carrier; at least the third information carrier includes a second identification code that can be read by an optical reader, which can transfer the reading to at least one second database with electronic records, of which at least one collects the associative data between said first and second identification codes, in addition to any other additional or supplementary information for the viewing by a human operator. Both the first and second databases can generally be encompassed within a large database, whose control could be carried out by a single entity, even though this second database is preferably independent from the first database.

The package is preferably a container made from transparent material or having at least one transparent part, which has the purpose of allowing a direct viewing and if needed the automated reading of the codes contained in the information carriers by means of suitable readers that include optical readers and radio frequency readers initially used for better control in the manufacturing process. It is usually hermetically sealed and sterilized once the components of the kit have been placed in the package, whether in the interior or exterior of the cavity, even though this practice could be modified, for example, by sterilizing any of the components of the kit and placing it in the package, which in this way does not have to be sterilized.

Two of the three carriers generally contain a visual representation of the first pet identification code, while the third carrier comprises a figurative representation of the second pet identification code. At least the first and third information carrier must be incorporated in the marketable autonomous unit to carry out the method. The second information carrier constitutes an additional printed identifier, which can be omitted if necessary and is preferably configured as a laminar carrier for one or several adhesive labels, including a visual representation corresponding to said first pet identification code; this laminar carrier preferably consists of several self-adhesive labels to be peeled off one by one for later use, for example, attached to the identification card of the pet.

The third information carrier includes a figurative representation of said second pet identification code, preferably configured as an identification plate. This third information carrier constitutes a module for information storage that can be read by a recognition system comprising a device for image acquisition, such as a photographic camera, scanner or the like, and the suitable software.

Such an image acquisition device or optical reader is configured integrated within a means of communication, such as a mobile phone, smart phone, tablet or the like, which utilizes communication and/or data transmission networks, such as a telephone network and/or the internet, for addressing or transferring data to a second database through an internet connection for web addresses.

Because the three information carriers are manufactured separately, it is possible to simplify the process for obtaining the autonomous unit and improve its storage and immediate availability, which allows the production of the necessary amount of tags and create templates for their simultaneous tagging, incorporating in each tag brief information with the second identification code to be updated after the final uniform identifier of resources is known. The information must not be in a defined order and does not need to be related in any way to the first identification codes that were independently programmed into the first information carriers until they are updated. If the use of self-adhesive labels is provided, this second identification carrier contains the visual representation of the first electronic identification code.

In this way is ensured the efficiency of the production and storage up until the moment of the full joining of the components of the kit with the integration in the syringe, their incorporation into the package, the sterilization of the autonomous unit and the verification of the first and second identification codes in the information carriers preferably within the quality control of the product via suitable readers, these being, for example, a radio frequency reader, a barcode reader, and an optical reader, and the procurement of the automated registration of the relationship between the codes in the electronic records of the second database, whereupon the autonomous unit can be introduced into the market.

Each tag includes a quick response code (QR), in which is encoded a link to a uniform resource locator (URL) or a uniform resource identifier (URI). The link is unique and different in each tag and the electronic record relevant for the second database in which are inputted the data of the manufacturer concerning the components of the autonomous unit and the relationship between the first and second identification codes is accessed through it. The input of data in the electronic record of the second database can include, for example, the data of the pet, the manufacturer or distributor of the product, the batch and dates of manufacture and expiration of the components, and other additional data, such as the field of application, used technology, regulations, promotions, links to other databases, etc., data which can be viewable and if required editable. In contrast with the typical use that is currently made of QR codes for animal identification, the identification codes and other data inputted by the user in the applications will be automatically inputted, making impossible any incorrect or fraudulent actions.

One example of first use would allow the veterinary professional to verify the suitability of the kit components after optical reading of the QR code without having to open the package. Once the unit is open, the veterinarian will implant the kit under the skin of the animal by means of a syringe that can be available preloaded with the first information carrier, and will if appropriate peel off the label off the second information carrier and apply it on the veterinary identification card. The identification plate that constitutes the third information carrier can be incorporated at this or another moment into the animal, for example, hung on the ear or around the neck.

If for any reason an outsider needs to identify the pet and/or determine its veterinary data, it is sufficient to apply the method suggested by the invention. Thus, when the optical reader of a means of communication, such as a mobile or smart phone, tablet, etc. provided with the suitable electronic application is brought close, the reading taken when the second identification code was read in the third information carrier, identification plate or tag carried by the pet, is directed to the corresponding electronic record of the second database in which the relationship data between the first and second code and the date of the kit components are viewable, and where are additionally included the links which, if necessary, direct to the first database, even without previous viewing of the electronic record in the database. This will allow the human operator to know the official identification number of the pet without the use of readers that utilize the principle of radio frequency and to use it to address and/or view the veterinary record of the pet in the first database for official/veterinarian use and of restricted access, which currently can only be accessed with the use of radio frequency readers. In this way, any person with a smart phone and a QR code reading application can easily verify the data of the pet and identify it, which will be used among other things for its recovery in case of loss.

It is obvious that it can be possible to immediately and easily duplicate or substitute any of the two first and second identification codes if one of them is known. It is also obvious that it can be possible to provide a tag with the second identification code on the outside of the package or incorporate it therein.

DESCRIPTION OF THE DRAWINGS

One exemplary embodiment, which is not limiting, of a pet identification system and the method used in the identification is shown in the enclosed drawings, in which:

FIG. 1 shows a vertical projection of a simplified example of a package for the marketable autonomous unit, which is a constitutive part of the identification system proposed by the invention;

FIG. 2 shows a top view of the package corresponding to FIG. 1 and the first, second and third information carriers positioned in the cavities defined in the package, which illustrates the position prior to its use.

PREFERRED EMBODIMENTS OF THE INVENTION

Figure 3:
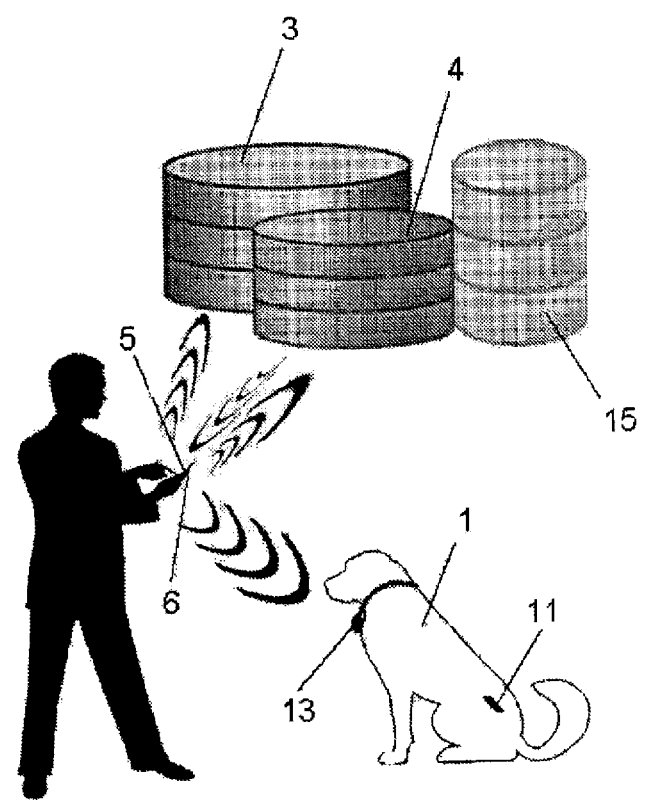
FIG. 3 illustrates an exemplary embodiment of the identification method, in which a human operator attempts to verify the identity of a pet.

The proposed system basically includes a pet (1), an autonomous unit (2), which is sterilized or wherein a few of whose components are sterilized, at least one first database (3) and at least one second database (4). In the example, both first (3) and second (4) databases are managed by different independent organizations. The databases (3) and (4) contain electronic records for the pets.

The system additionally includes a optical reader (6) customarily used in a portable means of communication (5), such as a smart phone or digital tablet, which includes the software that is suitable for performing the reading and linking it to a uniform resource locator via a data communication network, such as a mobile telephone network or the like.

In the embodiment proposed as non-limiting example and, as can be seen in FIGS. 1 and 2, the autonomous unit (2) includes the package (7), which in this approach is configured as a first sealing layer (8) for a second layer (9), which as can be seen is deformed by cavities (10) having different shape and size, in which are contained the components of the kit or a set of components:—the first information carrier (11) that consists of an electronic identification device comprising the first encoded identification code in the electronic device and the visual representation of said first pet identification code, which is not directly accessible for viewing save by means of radio frequency reading systems once it is implanted in the pet (1);—the syringe (14), in which the first information carrier (11) to be inserted into the pet (1) is contained;—the second information carrier (12), on which is temporarily applied an adhesive label that includes a visual representation corresponding to the first pet identification code (1); and the third information carrier (13), which consists of the identification plate that is externally adapted the pet (1), in the example hung around its neck, which includes a figurative representation of the second identification code of the pet (1), which is easy to see for any person and whose reading by means of an optical reading system allows access to the second database (4) where is displayed the relationship between both the first and second identification codes present in the pet (1) and the visual collection of the identifying data of the first identification code, without the need of using a reading system for radio frequency, which makes the identification more universally accessible.

As shown in FIG. 3, the human operator points the optical reader (6) located in the means of communication (5), which he/she carries in his/her hands, toward the figurative representation of the second identification code in the third information carrier (13) or plate, which hangs from the neck of the pet (1). The reading taken by the optical reader (6) is addressed by the application via a means of communication (5) and the mobile telephone network, the internet or any other data transmission network to the electronic record in the second database (4), in which are displayed the data regarding the relationship between the first and second codes, a display that provides information to the operator about the autonomous unit (2) and/or about the data regarding the relationship data between the first and second identification codes, which are respectively provided in the first information carrier (11) and the third information carrier (13) carried by the pet (1), which allows acquisition of the knowledge of the first identification code and opens up the final stage of verification, even though this final stage could be open despite it being invisible to the operator, directing the corresponding electronic record automatically into at least one of the first databases (3), the data regarding the code having been obtained, for example, by means of the means of communication (6), to the first database (3), in order to open the corresponding electronic record with official veterinary information and display the official veterinary information.

Because the second identification code is related to the first electronic identification code during the manufacturing process and the relationship incorporated into the second database, the possibility of fraud is eliminated or is highly reduced.

The invention has been described pursuant to the shown embodiments. It becomes obvious that it is possible to contribute modifying details and/or replace specific elements or devices for other equivalent ones or add supplementary devices of the known type without abandoning the scope of the invention.

The invention claimed is:

1. A system for identification of an animal comprising:
a first non-transitory data carrier configured for carrying by an animal including an electronic identification device having a first identification code which is readable by a radio frequency reader and a visual representation of said first identification code;
at least a first database containing electronic records, wherein at least one of said electronic records includes veterinary data of a predetermined animal;
a sterilized autonomous unit including (1) a package having at least one internal cavity and (2)(a) a kit contained in the at least one internal cavity or (2)(b) at least one component of said kit contained in said at least one internal cavity; wherein the kit comprises at least one of said first non-transitory data carrier, a second non-transitory data carrier, and a third non-transitory data carrier, and said third non-transitory data carrier includes a second identification code readable by an optical reader;

at least a second database containing electronic records, wherein at least one of said electronic records of said second database includes associative data between said first identification code and said second identification code, which are each present in the autonomous unit until such are incorporated into said predetermined animal corresponding to said veterinary data; and wherein said second identification code is configured to activate upon said optical reading of said second identification code, a corresponding electronic record in said second database allowing access to (i) view the associative data between the first identification code and said second identification code and (ii) guide reading of the corresponding electronic record into said first database by a uniform resource identifier associated with said corresponding electronic record in said second database.

2. The system for identification according to claim 1, wherein said third non-transitory data carrier comprises an identification plate with a figurative representation of a third identification code which includes a uniform resource identifier.

3. A system for identification according to claim 1, wherein said optical reader is integrated in a communication device that uses a telephone network or data communication network for transfer of data to said second database.

4. A method for identification of an animal using the system of claim 1, comprising inputting at least the associative data between said first identification code and said second identification code, which are respectively included in said first non-transitory data carrier and said third non-transitory data carrier, into said at least one electronic record of said second database, and allowing inputting of additional data;

reading of the second identification code by an optical reader included in the communication device by a user of the system;

transferring the reading to said second database and via the communication device activating the corresponding electronic record in said second database in order to obtain information about at least the associative data between said first identification code and said second identification code.

5. The method for identification according to claim 4, further comprising guiding the corresponding electronic record with veterinary data in said first database via said uniform resource identifier into the corresponding electronic record of said second database and visual verification of the veterinary data by the user.

6. The method for identification according to claim 4, further comprising extracting information comprising:

visual verification by the user of information contained in said corresponding electronic record of the second database and the associative data between said first identification code and said second identification code displayed by said electronic record selected in said second database and extracting of the first identification code;

inputting the first identification code into the communication device carried by the user and subsequent transfer to said first database to open the corresponding electronic record containing information; and visual verification by the user of the veterinary data.

* * * * *